United States Patent
Koike et al.

(10) Patent No.: US 11,680,177 B2
(45) Date of Patent: Jun. 20, 2023

(54) INK COMPOSITION

(71) Applicant: Seiko Epson Corporation, Tokyo (JP)

(72) Inventors: Naoki Koike, Matsumoto (JP); Toru Saito, Yamagata (JP); Toshiyuki Yoda, Matsumoto (JP)

(73) Assignee: SEIKO EPSON CORPORATION

( * ) Notice: Subject to any disclaimer, the term of this patent is extended or adjusted under 35 U.S.C. 154(b) by 470 days.

(21) Appl. No.: 16/802,980

(22) Filed: Feb. 27, 2020

(65) Prior Publication Data

US 2020/0277504 A1  Sep. 3, 2020

(30) Foreign Application Priority Data

Feb. 28, 2019 (JP) .............................. JP2019-035563

(51) Int. Cl.
| | |
|---|---|
| *C09D 11/00* | (2014.01) |
| *C09D 1/00* | (2006.01) |
| *C08F 2/46* | (2006.01) |
| *C08F 2/50* | (2006.01) |
| *C08G 61/04* | (2006.01) |
| *C09D 11/101* | (2014.01) |
| *C09D 11/106* | (2014.01) |
| *C08F 220/34* | (2006.01) |
| *C08F 220/18* | (2006.01) |
| *C08F 220/20* | (2006.01) |
| *C08K 5/5397* | (2006.01) |
| *C08F 226/06* | (2006.01) |
| *C08F 236/02* | (2006.01) |

(52) U.S. Cl.
CPC .............. *C09D 11/101* (2013.01); *C08F 2/50* (2013.01); *C08F 220/1806* (2020.02); *C08F 220/1807* (2020.02); *C08F 220/1811* (2020.02); *C08F 220/20* (2013.01); *C08F 220/343* (2020.02); *C08F 226/06* (2013.01); *C08F 236/02* (2013.01); *C08K 5/5397* (2013.01); *C09D 11/106* (2013.01)

(58) Field of Classification Search
CPC ............ C08F 220/343; C08F 220/1806; C08F 220/301; C08F 220/1809; C08F 220/1811; C08F 220/20; C08F 220/1807; C08F 220/283; C08F 220/40; C08F 226/06; C08F 2/50; C08F 236/02; C08K 5/2397; C09D 11/101; C09D 11/106
USPC .... 106/31.13, 31.01; 522/6, 189, 184, 71, 1; 520/1
See application file for complete search history.

(56) References Cited

U.S. PATENT DOCUMENTS

| | | | |
|---|---|---|---|
| 5,840,806 A | 11/1998 | Komazaki et al. | |
| 9,458,333 B2 | 10/2016 | Hall et al. | |
| 9,469,771 B2 | 10/2016 | Mizutaki et al. | |
| 10,323,155 B2 | 6/2019 | Toeda et al. | |
| 2006/0128823 A1 | 6/2006 | Tsuchimura et al. | |
| 2006/0160917 A1 | 7/2006 | Oyanagi et al. | |
| 2007/0211111 A1 | 9/2007 | Hayata | |
| 2012/0029108 A1 | 2/2012 | Nakane et al. | |
| 2012/0129972 A1 | 5/2012 | Hall et al. | |
| 2012/0208915 A1 | 8/2012 | Hayata et al. | |
| 2012/0274717 A1 | 11/2012 | Nakano et al. | |
| 2013/0030076 A1 | 1/2013 | Weinmann et al. | |
| 2013/0260092 A1 | 10/2013 | Araki et al. | |
| 2013/0295342 A1 | 11/2013 | Araki et al. | |
| 2014/0232790 A1 | 8/2014 | Makuta | |
| 2015/0091974 A1 | 4/2015 | Aoyama et al. | |
| 2015/0315396 A1 | 11/2015 | Kida et al. | |
| 2017/0233594 A1 | 8/2017 | Yoda et al. | |
| 2018/0057703 A1* | 3/2018 | Cong ................. | C09D 11/101 |
| 2018/0072845 A1 | 3/2018 | Zhou et al. | |
| 2018/0194955 A1 | 7/2018 | Zhou et al. | |
| 2018/0223117 A1 | 8/2018 | Toeda et al. | |
| 2018/0244933 A1 | 8/2018 | Tsuchiya et al. | |
| 2019/0211222 A1 | 7/2019 | Toeda | |
| 2020/0254755 A1* | 8/2020 | Nakano ................. | C09D 11/30 |
| 2020/0254756 A1* | 8/2020 | Nakano ............. | C08F 220/1806 |
| 2020/0392353 A1* | 12/2020 | Tanaka ................. | C09D 11/322 |

FOREIGN PATENT DOCUMENTS

| | | | |
|---|---|---|---|
| JP | 2006-249155 A | | 9/2006 |
| JP | 2006-274025 A | | 10/2006 |
| JP | 2009-197194 A | | 9/2009 |
| JP | 2011168736 | * | 9/2011 |
| JP | 2012-007107 A | | 1/2012 |
| JP | 2012-031254 A | | 2/2012 |
| JP | 2012-207199 A | | 10/2012 |
| JP | 2012-525445 A | | 10/2012 |

(Continued)

OTHER PUBLICATIONS

Hirose, JP 2015-081284 Machine Translation, Apr. 27, 2015 (Year: 2015).*

(Continued)

*Primary Examiner* — Jessica Whiteley
(74) *Attorney, Agent, or Firm* — Harness, Dickey & Pierce, P.L.C.

(57) ABSTRACT

A radiation-curing ink jet ink composition includes a urethane (meth)acrylate including one (meth)acryloyl group, the amount of the urethane (meth)acrylate being 5.0% by mass or more and 30.0% by mass or less of the total amount of the ink composition, and a (meth)acrylate including an aromatic ring and one (meth)acryloyl group, the amount of the (meth)acrylate being 4.0% by mass or more and 50.0% by mass or less of the total amount of the ink composition.

7 Claims, No Drawings

(56) References Cited

FOREIGN PATENT DOCUMENTS

| JP | 2013-203873 A | | 10/2013 |
|---|---|---|---|
| JP | 2013-227515 A | | 11/2013 |
| JP | 2013-237834 A | | 11/2013 |
| JP | 2015081284 | * | 4/2015 |
| JP | 2016-006179 | | 1/2016 |
| JP | 2018-127527 A | | 8/2018 |
| JP | 2018-141101 A | | 9/2018 |
| WO | 2017-217187 A1 | | 12/2017 |
| WO | 2019-096450 A1 | | 5/2019 |

OTHER PUBLICATIONS

Ito et al, JP 2011-168736 Machine Translation, Sep. 1, 2011 (Year: 2011).*
Sartomer SR 9003 https://emea.sartomer.arkema.com/en/product-finders/product/f/sartomer_MonomerAcrylates_EMEA/p/sr9003/ (Year: 2010).*

* cited by examiner

INK COMPOSITION

The present application is based on, and claims priority from, JP Application Serial Number 2019-035563, filed Feb. 28, 2019, the disclosure of which is hereby incorporated by reference herein in its entirety.

BACKGROUND

1. Technical Field

The present disclosure relates to an ink composition used in an ink jet recording method.

2. Related Art

An ink jet recording method enables high-definition image recording with a relatively simple apparatus and has been rapidly developed in various fields. Recently, there has been a demand for the application of an ink jet recording method for commercial purpose and, accordingly, an increase in the variety of recording media that can be used in an ink jet recording method is anticipated. Under these circumstances, photocuring ink jet inks have been proposed. For example, a photocuring ink jet printing ink composition that includes at least a photopolymerizing compound and a photopolymerization initiator, the photopolymerizing compound including a photopolymerizing monomer having one ethylenically unsaturated double bond and at least one urethane linkage, the amount of the photopolymerizing monomer being set such that the amount of urethane linkage included in 1 g of the photopolymerizing compound is 2.8 to 4.7 mmol, is described in JP-A-2012-007107.

There has been a demand for printing an image on a recording medium made of a resin, which is commonly used as a label for commodities. In particular, in the case where such a recording medium is intended to be used as a label, high adhesion of inks to the resin recording medium and high abrasion resistance of the resulting printed article are required. For example, when the content of a monomer that includes at least one urethane linkage in an ink composition is increased as in JP-A-2012-007107, the chemical composition of the ink composition needs to be improved in order to enhance the storage stability of the ink composition and keep the viscosity of the ink composition low.

SUMMARY

The inventors of the present disclosure found that an ink composition having excellent adhesion, excellent abrasion resistance, excellent storage stability, and a low viscosity may be produced by adding the urethane (meth)acrylate described below and the (meth)acrylate including an aromatic ring which is described below to the ink composition in predetermined amounts.

Specifically, the present disclosure relates to a radiation-curing ink jet ink composition including:

a urethane (meth)acrylate including one (meth)acryloyl group, the amount of the urethane (meth)acrylate being 5.0% by mass or more and 30.0% by mass or less of the total amount of the ink composition; and a (meth)acrylate including an aromatic ring and one (meth)acryloyl group, the amount of the (meth)acrylate being 4.0% by mass or more and 50.0% by mass or less of the total amount of the ink composition. The above-described ink composition may include a (meth)acrylate including an alicyclic group, wherein a homopolymer of the (meth)acrylate has a glass-transition temperature of 30° C. or more. The (meth)acrylate including an alicyclic group may include isobornyl acrylate, tert-butylcyclohexyl acrylate, dicyclopentadienyl acrylate, dicyclopentanyl acrylate, or 3,3,5-trimethylcyclohexyl acrylate. The ink composition may include a monofunctional monomer including a heterocyclic group including a nitrogen atom. The monofunctional monomer including a heterocyclic group including a nitrogen atom may include N-vinylcaprolactam or (meth)acryloylmorpholine. The amount of a monomer including two or more polymerizable functional groups may be 5.0% by mass or less of the total amount of the ink composition. The ink composition may include an acylphosphine oxide polymerization initiator including an aromatic ring.

DESCRIPTION OF EXEMPLARY EMBODIMENTS

Details of an embodiment of the present disclosure (hereinafter, referred to as "the embodiment") are described below. The present disclosure is not limited by the embodiment, and various modification may be made to the present disclosure without departing the scope of the present disclosure.

Ink Composition

An ink composition according to the embodiment is a radiation-curing ink jet ink composition that includes:

a urethane (meth)acrylate including one (meth)acryloyl group (hereinafter, this urethane (meth)acrylate is referred to simply as "acrylate (A)"), the amount of the urethane (meth)acrylate being 5.0% by mass or more and 30.0% by mass or less of the total amount of the ink composition; and a (meth)acrylate including an aromatic ring and one (meth)acryloyl group (hereinafter, this (meth)acrylate is referred to simply as "acrylate (B)"), the amount of the (meth)acrylate being 4.0% by mass or more and 50.0% by mass or less of the total amount of the ink composition. The above-described ink composition may have excellent adhesion, excellent abrasion resistance, excellent storage stability, and a low viscosity.

The definitions of the terms used herein are as follows. The term "radiation-curing ink jet ink composition" refers to an ink composition that is to be deposited onto a recording medium by an ink jet recording method and subsequently irradiated with active radiation to form a cured film. The term "(meth)acrylate" refers to an acrylate or a methacrylate. In the same manner as above, the term "(meth)acryloyl group" refers to an acryloyl group or a methacryloyl group.

Acrylate (A)

The acrylate (A) according to the embodiment is a urethane (meth)acrylate that includes one (meth)acryloyl group. That is, the acrylate (A) is a monofunctional urethane (meth)acrylate. The ink composition according to the embodiment may have high adhesion since it includes the acrylate (A). The reason for this is not clear. It is considered that the ink composition according to the embodiment may have high adhesion because the acrylate (A) includes a urethane linkage. The term "urethane (meth)acrylate" used herein refers to a (meth)acrylate that includes a urethane linkage in the molecule, which is preferably a (meth)acrylate that includes one urethane linkage. Examples of the acrylate (A) include, but are not limited to, an aliphatic urethane (meth)acrylate and an aromatic urethane (meth)acrylate. Among these, an aliphatic urethane (meth)acrylate is preferable. The aliphatic urethane (meth)acrylate is preferably an alkylcarbamoyloxyalkyl (meth)acrylate. The total number of carbon atoms included in the alkylcarbamoyloxyalkyl group is preferably 2 to 15, is more preferably 3 to 13, and is further preferably 3 to 8. Examples of the aliphatic urethane (meth)acrylate include, but are not limited to, 2-(butylcarbamoyloxy) ethyl (meth) acrylate, 2-(butylcarbamoyloxy) propyl (meth) acrylate, 4-(butylcarbamoyloxy) butyl (meth) acrylate, 2-(isopropylcarbamoyloxy) ethyl (meth) acrylate, 2-(isopropylcarbamoyloxy) propyl (meth) acrylate, and 4-(isopropylcarbamoyloxy)butyl (meth) acrylate. Examples of the aromatic urethane (meth)acrylate include, but are not limited to, 2-(phenylcarbamoyloxy)ethyl (meth)acrylate, 2-(phenylcarbamoyloxy) propyl (meth) acrylate, 4-(phenylcarbamoyloxy) butyl (meth) acrylate, 2-(benzylcarbamoyloxy) ethyl (meth) acrylate, 2-(benzylcarbamoyloxy)propyl (meth)acrylate, and 4-(benzylcarbamoyloxy)butyl (meth)acrylate. Among these, an aliphatic urethane (meth)acrylate is preferable, and 2-(butylcarbamoyloxy)ethyl (meth)acrylate is more preferable.

The content of the acrylate (A) in the ink composition is 5.0% by mass or more and 30.0% by mass or less of the total amount of the ink composition. When the content of the acrylate (A) is 5.0% by mass or more, high adhesion may be achieved. Furthermore, when the content of the acrylate (A) is 5.0% by mass or more, the solubility of an acylphosphine oxide photopolymerization initiator in the ink composition may be further enhanced. When the content of the acrylate (A) is 30.0% by mass or less, the ink composition may have a low viscosity and excellent storage stability. The content of the acrylate (A) in the ink composition is preferably 7.0% by mass or more and 28.0% by mass or less, is more preferably 11.6% by mass or more and 25.0% by mass or less, and is further preferably 10.0% by mass or more and 20.0% by mass or less of the total amount of the ink composition.

Acrylate (B)

The acrylate (B) according to the embodiment is a (meth) acrylate that includes an aromatic ring and one (meth) acryloyl group. The monofunctional (meth)acrylate monomer including an aromatic ring skeleton may be any monofunctional (meth)acrylate monomer that includes at least one aromatic ring skeleton in the structure. The aromatic ring may include a substituent, such as an alkyl group having 1 to 10 carbon atoms, a hydroxyl group, or an aryl group having 6 to 16 carbon atoms, and may include another aromatic ring, a saturated ring, or an unsaturated ring connected to the aromatic ring. The aromatic ring may be directly bonded to an oxygen atom included in a (meth) acryloyloxy group or may be bonded to the oxygen atom with, for example, an alkylene group having 1 to 10 carbon atoms which is interposed between the aromatic ring and the oxygen atom. The alkylene group may include a substituent, such as an alkyl group having 1 to 10 carbon atoms, a hydroxyl group, or an aryl group having 6 to 16 carbon atoms. The main chain of the alkylene group may include an ester or ether linkage. The number of the atoms that constitute the aromatic ring is preferably, but not limited to, 6 to 18 and is more preferably 6 to 10.

Examples of the acrylate (B) include, but are not limited to, phenoxyethyl (meth)acrylate, 2-hydroxy-3-phenoxypropyl (meth)acrylate, and benzyl (meth)acrylate. Among these, phenoxyethyl (meth)acrylate and benzyl (meth)acrylate are preferable. The above acrylates (B) may be used alone or in combination with two or more. Using the above acrylates (B) enables the production of an ink composition having excellent storage stability and a low viscosity and a coating film having excellent stretchability. In addition, in the case where an additive is added to the ink composition, the solubility of the additive in the ink composition may be enhanced. The solubility of a polymerization initiator in the ink composition may be enhanced. In particular, the solubility of an acylphosphine oxide photopolymerization initiator in the ink composition may be enhanced.

The content of the acrylate (B) in the ink composition is 4.0% by mass or more and 50.0% by mass or less of the total amount of the ink composition. When the content of the acrylate (B) is 50.0% by mass or less, excellent abrasion resistance may be achieved. In order to further enhance abrasion resistance, the content of the acrylate (B) is preferably 5.0% by mass or more and 50.0% by mass or less, is more preferably 7.0% by mass or more and 40.0% by mass or less, is further preferably 10.0% by mass or more and 35.0% by mass or less, and is most preferably 25.0% by mass or more and 35.0% by mass or less of the total amount of the ink composition. When the content of the acrylate (B) is 5.0% by mass or more, the solubility of an acylphosphine oxide photopolymerization initiator in the ink composition may be further enhanced.

Acrylate (C)

The ink composition according to the embodiment preferably includes a (meth)acrylate including an alicyclic group, a homopolymer of the (meth)acrylate having a glass-transition temperature of 30° C. or more (hereinafter, this (meth)acrylate is referred to simply as "acrylate (C)"). Adding the acrylate (C) to the ink composition may further enhance abrasion resistance. The glass-transition temperature of a homopolymer of the acrylate (C) is preferably 30° C. or more and 150° C. or less, is more preferably 30° C. or more and 130° C. or less, and is further preferably 30° C. or more and 120° C. or less. The term "glass-transition temperature of homopolymer" used herein refers to the glass-transition temperature of a homopolymer synthesized from the acrylate (C). The glass-transition temperature of the homopolymer may be measured using a sample prepared by polymerizing the monomer until the glass-transition temperature of the sample stabilizes, by differential scanning calorimetry (DSC) conforming to JIS K7121:2012. Examples of a differential scanning calorimetry apparatus include "DSC6220" produced by Seiko Instruments & Electronics Ltd.

The acrylate (C) includes at least one alicyclic group in the structure and does not include an aromatic ring in the structure. The alicyclic group may include a substituent, such as an alkyl group having 1 to 10 carbon atoms, a hydroxyl group, or an aryl group having 6 to 16 carbon atoms, and may include an aromatic ring, a saturated ring, or an unsaturated ring connected to the alicyclic group. The alicyclic group may be directly bonded to an oxygen atom included in a (meth)acryloyloxy group or may be bonded to the oxygen atom with, for example, an alkylene group having 1 to 10 carbon atoms which is interposed between the alicyclic group and the oxygen atom. The alkylene group may include a substituent, such as an alkyl group having 1 to 10 carbon atoms, a hydroxyl group, or an aryl group having 6 to 16 carbon atoms. The main chain of the alkylene group may include an ester or ether linkage. The number of the atoms that constitute the ring included in the alicyclic group is preferably, but not limited to, 3 to 20 and is more preferably 5 to 12.

Examples of the acrylate (C) include, but are not limited to, isobornyl (meth)acrylate, cyclohexyl (meth) acrylate, tert-butylcyclohexyl (meth) acrylate, dicyclopentadienyl (meth) acrylate, dicyclopentanyl (meth) acrylate, 3,3,5-trimethylcyclohexyl acrylate, adamantyl acrylate, 2-methyl-2-adamantyl acrylate, 2-ethyl-2-adamantyl acrylate, 2-isopropyl-2-adamantyl acrylate, and 1-(1-adamantyl)-1- methylethyl acrylate. Among the above acrylates (C), isobornyl (meth)acrylate, tert-butylcyclohexyl acrylate, dicyclopentadienyl (meth) acrylate, dicyclopentanyl (meth) acrylate, and 3,3,5-trimethylcyclohexyl acrylate are preferable.

The content of the acrylate (C) in the ink composition is preferably 3.0% by mass or more and 60.0% by mass or less, is more preferably 5.0% by mass or more and 50.0% by mass or less, and is further preferably 10.0% by mass or more and 30.0% by mass or less of the total amount of the ink composition. When the content of the acrylate (C) falls within the above range, abrasion resistance may be further enhanced. Moreover, the solubility of a polymerization initiator may be further enhanced.

Monomer (D)

The ink composition according to the embodiment preferably includes a monofunctional monomer including a heterocyclic group including a nitrogen atom (hereinafter, this monomer is referred to simply as "monomer (D)"). Adding the monomer (D) to the ink composition may further enhance adhesion. Examples of the monomer (D) include, but are not limited to, N-vinylcaprolactam, N-vinyl-2-pyrrolidone, (meth) acryloylmorpholine, 1-(meth)acryloylpyrrolidin-2-one, 1-(meth)acryloylpiperidin-2-one, and (2-methyl-2-ethyl-1,3-dioxolan-4-yl)methyl (meth)acrylate. Among the above monomers (D), N-vinylcaprolactam and (meth)acryloylmorpholine are preferable.

The content of the monomer (D) in the ink composition is preferably 3.0% by mass or more and 40.0% by mass or less, is more preferably 4.0% by mass or more and 31.0% by mass or less, is further preferably 10.0% by mass or more and 20.0% by mass or less, and is most preferably 12.6% by mass or more and 17.6% by mass or less of the total amount of the ink composition. When the content of the monomer (D) falls within the above range, abrasion resistance may be further enhanced. In addition, the solubility of a polymerization initiator may be further enhanced.

Multifunctional Monomer

The content of a monomer that includes two or more polymerizable functional groups (hereinafter, this monomer is referred to simply as "multifunctional monomer") in the ink composition according to the embodiment is preferably 5.0% by mass or less of the total amount of the ink composition. That is, it is preferable that a monomer including two or more polymerizable functional groups be absent in the ink composition or the content of such a monomer be 5% by mass or less. In such a case, the stretchability of the printed article may be markedly enhanced. Some of the ink compositions used in the related art were required to be capable of producing a printed article having high stretchability; it has been anticipated that cracking or peeling does not occur in an image formed in a recorded article even when the recorded article is elongated 100% by tension. On the other hand, it was found that the ink composition according to the embodiment, which has the above-described specific structure, is capable of preventing the occurrence of cracking or peeling in an image formed in a recorded article and achieving markedly excellent stretchability even when the elongation of the recorded article is 200%, in the case where the content of the monomer including two or more polymerizable functional groups falls within the above-described range. When the printed article has markedly high stretchability, the likelihood of cracking or peeling occurring in the image may be reduced even when, for example, the printed article is subjected to working, such as bending or drawing, in the production of labels or the like.

The content of the multifunctional monomer in the ink composition is preferably 0% by mass or more and 5.0% by mass or less, is more preferably 1.0% by mass or more and 5.0% by mass or less, and is further preferably 1.5% by mass or more and 3.0% by mass or less of the total amount of the ink composition.

Examples of the polymerizable functional groups include, but are not limited to, a (meth)acryloyl group and a vinyl group. In the case where the ink composition includes the multifunctional monomer, examples of the multifunctional monomer include, but are not limited to, the monomer (E) described below and a multifunctional (meth)acrylate. One type of the multifunctional monomer may be used alone, or two or more types of the multifunctional monomers may be used in combination. The monomer (E) is the monomer represented by Formula (1) below:

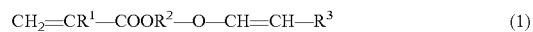

$$CH_2=CR^1-COOR^2-O-CH=CH-R^3 \quad (1)$$

where $R^1$ is a hydrogen atom or a methyl group; $R^2$ is a divalent organic group including 2 to 20 carbon atoms; $R^3$ is a hydrogen atom or a monovalent organic group including 1 to 11 carbon atoms; and the divalent organic group and the monovalent organic group may include a substituent (hereinafter, the above-described monomer is referred to simply as "monomer (E)"). Adding the monomer (E) to the ink composition may enhance abrasion resistance.

Examples of the divalent organic group represented by $R^2$ include, but are not limited to, a linear, branched, or cyclic alkylene group; an alkylene group including an ether or ester linkage in the structure; a divalent aromatic ring; and a divalent aromatic ring including a substituent including 6 to 11 carbon atoms. Examples of the linear, branched, or cyclic alkylene group include, but are not limited to, an ethylene group, an n-propylene group, an isopropylene group, and a butylene group. Examples of the alkylene group including an ether or ester linkage in the structure include, but are not limited to, an oxyethylene group, an oxy-n-propylene group, an oxyisopropylene group, an oxybutylene group, and an ethyleneoxyethylene group ($-CH_2CH_2OCH_2CH_2-$). $R^2$ is preferably an alkylene group including 2 to 6 carbon atoms or an alkylene group that includes 2 to 9 carbon atoms and an oxygen atom constituting an ether linkage in the structure.

Examples of the monovalent organic group represented by $R^3$ include, but are not limited to, a linear, branched, or cyclic alkyl group and a group including an aromatic ring including 6 to 11 carbon atoms. Examples of the alkyl group represented by $R^3$ include, but are not limited to, a methyl group, an ethyl group, an n-propyl group, and an isopropyl group. Examples of the group including an aromatic ring which is represented by $R^3$ include, but are not limited to, a phenyl group and a benzyl group. $R^3$ is preferably a hydrogen atom.

In the case where the above-described organic groups include substituents, the substituents may be classified into two types: substituents that include a carbon atom; and substituents that do not include a carbon atom. In the case where the substituents include a carbon atom, the carbon atom is included in the calculation of the number of carbon atoms included in the organic residue. Examples of the substituents including a carbon atom include, but are not limited to, a carboxyl group and an alkoxy group. Examples of the substituents that do not include a carbon atom include, but are not limited to, a hydroxyl group and a halo group.

Examples of the monomer (E) include, but are not limited to, 2-vinyloxyethyl (meth)acrylate, 3-vinyloxypropyl (meth)acrylate, 1-methyl-2-vinyloxyethyl (meth)acrylate, 2-vinyloxypropyl (meth) acrylate, 4-vinyloxybutyl (meth) acrylate, 1-methyl-3-vinyloxypropyl (meth) acrylate, 1-vinyloxymethylpropyl (meth) acrylate, 2-methyl-3-vinyloxypropyl (meth)acrylate, 1,1-dimethyl-2-vinyloxyethyl (meth) acrylate, 3-vinyloxybutyl (meth) acrylate, 1-methyl-2-vinyloxypropyl (meth) acrylate, 2-vinyloxybutyl (meth) acrylate, 4-vinyloxycyclohexyl (meth) acrylate, 6-vinyloxyhexyl (meth)acrylate, 4-vinyloxymethylcyclohexylmethyl (meth) acrylate, 3-vinyloxymethylcyclohexylmethyl (meth) acrylate, 2-vinyloxymethylcyclohexylmethyl (meth) acrylate, p-vinyloxymethylphenylmethyl (meth) acrylate, m-vinyloxymethylphenylmethyl (meth) acrylate, o-vinyloxymethylphenylmethyl (meth) acrylate, 2-(vinyloxyethoxy) ethyl (meth) acrylate, 2-(vinyloxyisopropoxy) ethyl (meth) acrylate, 2-(vinyloxyethoxy) propyl (meth) acrylate, 2-(vinyloxyethoxy) isopropyl (meth) acrylate, 2-(vinyloxyisopropoxy) propyl (meth) acrylate, 2-(vinyloxyisopropoxy) isopropyl (meth) acrylate, 2-(vinyloxyethoxyethoxy)ethyl (meth) acrylate, 2-(vinyloxyethoxyisopropoxy) ethyl (meth) acrylate, 2-(vinyloxyisopropoxyethoxy) ethyl (meth) acrylate, 2-(vinyloxyisopropoxyisopropoxy)ethyl (meth) acrylate, 2-(vinyloxyethoxyethoxy) propyl (meth) acrylate, 2-(vinyloxyethoxyisopropoxy)propyl (meth)acrylate, 2-(vinyloxyisopropoxyethoxy)propyl (meth)acrylate, 2-(vinyloxyisopropoxyisopropoxy)propyl (meth) acrylate, 2-(vinyloxyethoxyethoxy) isopropyl (meth)acrylate, 2-(vinyloxyethoxyisopropoxy)isopropyl (meth) acrylate, 2-(vinyloxyisopropoxyethoxy)isopropyl (meth) acrylate, 2-(vinyloxyisopropoxyisopropoxy)isopropyl (meth) acrylate, 2-(vinyloxyethoxyethoxyethoxy)ethyl (meth) acrylate, 2-(vinyloxyethoxyethoxyethoxyethoxy)ethyl (meth) acrylate, 2-(isopropenoxyethoxy)ethyl (meth)acrylate, 2-(isopropenoxyethoxyethoxy)ethyl (meth) acrylate, 2-(isopropenoxyethoxyethoxyethoxy)ethyl (meth)acrylate, 2-(isopropenoxyethoxyethoxyethoxyethoxy)ethyl (meth) acrylate, polyethylene glycol monovinyl ether (meth)acrylate, and polypropylene glycol monovinyl ether (meth) acrylate.

Among the above monomers (E), 2-vinyloxyethyl (meth) acrylate, 3-vinyloxypropyl (meth) acrylate, 1-methyl-2-vinyloxyethyl (meth) acrylate, 2-vinyloxypropyl (meth)acrylate, 4-vinyloxybutyl (meth)acrylate, 4-vinyloxycyclohexyl (meth) acrylate, 5-vinyloxypentyl (meth)acrylate, 6-vinyloxyhexyl (meth)acrylate, 4-vinyloxymethylcyclohexylmethyl (meth) acrylate, p-vinyloxymethylphenylmethyl (meth) acrylate, 2-(vinyloxyethoxy) ethyl (meth) acrylate, 2-(vinyloxyethoxyethoxy)ethyl (meth)acrylate, and 2-(vinyloxyethoxyethoxyethoxy)ethyl (meth)acrylate are preferable, and 2-(vinyloxyethoxy)ethyl (meth)acrylate is more preferable.

The content of the monomer (E) in the ink composition is preferably 0% by mass or more and 5.0% by mass or less, is more preferably 1.0% by mass or more and 5.0% by mass or less, and is further preferably 1.5% by mass or more and 3.0% by mass or less of the total amount of the ink composition. When the content of the monomer (E) in the ink composition according to the embodiment is 5.0% by mass or less, the stretchability of the printed article may be markedly enhanced. When the content of the monomer (E) is equal to or larger than the above lower limit, abrasion resistance may be further enhanced. In addition, the solubility of a polymerization initiator may be further enhanced.

Examples of the multifunctional (meth)acrylate, which is an example of the multifunctional monomer, include, but are not limited to, a difunctional (meth)acrylate, a trifunctional (meth)acrylate, and a tetrafunctional (meth) acrylate.

Examples of the difunctional (meth)acrylate include, but are not limited to, 1,4-butanediol di(meth)acrylate, 1,6-hexanediol di(meth)acrylate, 1,9-nonanediol di(meth)acrylate, 1,10-decanediol di(meth)acrylate, 2-hydroxy-3-acryloyloxypropyl (meth)acrylate, ethylene glycol di(meth) acrylate, diethylene glycol di(meth)acrylate, triethylene glycol di(meth)acrylate, tetraethylene glycol di(meth)acrylate, polyethylene glycol di(meth)acrylate, dipropylene glycol di(meth)acrylate, tripropylene glycol di(meth)acrylate, triisopropylene glycol di(meth)acrylate, 1,3-butylene glycol di(meth)acrylate, poly(butanediol) di(meth)acrylate, tricyclodecanedimethanol di(meth)acrylate, ethoxylated bisphenol A di(meth)acrylate, propoxylated neopentyl glycol di(meth)acrylate, and propoxylated bisphenol A di(meth) acrylate.

Examples of the trifunctional (meth)acrylate include, but are not limited to, trimethylolpropane tri(meth)acrylate, pentaerythritol tri(meth)acrylate, ethoxylated isocyanuric acid tri(meth)acrylate, and ε-caprolactone-modified tris-(2-(meth)acryloxyethyl) isocyanurate. Examples of the tetrafunctional (meth)acrylate include pentaerythritol tetra(meth) acrylate, ethoxylated pentaerythritol tetra(meth)acrylate, and ditrimethylolpropane tetra(meth)acrylate.

In the case where the ink composition includes the multifunctional (meth)acrylate, among the above multifunctional (meth)acrylates, the difunctional (meth)acrylates are preferable, and dipropylene glycol di(meth)acrylate, tripropylene glycol di(meth)acrylate, tetraethylene glycol di(meth)acrylate, tricyclodecanedimethanol di(meth)acrylate, and propoxylated neopentyl glycol di(meth)acrylate are more preferable.

The content of the multifunctional (meth)acrylate in the ink composition is preferably 0% by mass or more and 5.0% by mass or less, is more preferably 1.0% by mass or more and 5.0% by mass or less, and is further preferably 1.5% by mass or more and 3.0% by mass or less of the total amount of the ink composition. When the content of the multifunctional (meth)acrylate in the ink composition according to the embodiment is 5.0% by mass or less, the stretchability of the printed article may be markedly enhanced. When the content of the multifunctional (meth)acrylate falls within the above range, abrasion resistance may be further enhanced. Furthermore, the solubility of a polymerization initiator in the ink composition may be further enhanced.

Polymerization Initiator

The ink composition according to the embodiment preferably includes a polymerization initiator. Examples of the polymerization initiator include, but are not limited to, publicly known polymerization initiators, such as an alkylphenone polymerization initiator, an acylphosphine oxide polymerization initiator, a titanocene polymerization initiator, and a thioxanthone polymerization initiator. Among these, an acylphosphine oxide polymerization initiator is preferable. Adding an acylphosphine oxide polymerization initiator to the ink composition may enhance the curability of the composition and particularly further enhance the curability of the composition in a curing process in which UV-LED is used.

The acylphosphine oxide polymerization initiator includes an aromatic ring in order to enhance the solubility of the polymerization initiator in the ink composition. Examples of the acylphosphine oxide polymerization initiator include, but are not limited to, bis(2,4,6-trimethylbenzoyl)-phenylphosphine oxide, 2,4,6-trimethylbenzoyl-diphenyl-phosphine oxide, and bis-(2,6-dimethoxybenzoyl)-2,4,4-trimethylpentylphosphine oxide. The above acylphosphine oxide polymerization initiators may be used alone or in combination of two or more. Among these, bis(2,4,6-trimethylbenzoyl)-phenylphosphine oxide and 2,4,6-trimethylbenzoyl-diphenyl-phosphine oxide are preferably used in combination with each other in order to further enhance the solubility of the polymerization initiator in the ink composition and the curability of the ink composition. Examples of commercial acylphosphine oxide polymerization initiators include "IRGACURE 819" (product name, produced by BASF SE, bis(2,4,6-trimethylbenzoyl)-phenylphosphine oxide); "IRGACURE TPO" (product name, produced by BASF SE, 2,4,6-trimethylbenzoyl-diphenyl-phosphine oxide); and "DAROCUR TPO" (product name, produced by BASF SE, 2,4,6-trimethylbenzoyl-diphenyl-phosphine oxide).

The content of the acylphosphine oxide polymerization initiator in the ink composition is preferably 3.0% by mass or more and 15.0% by mass or less and is more preferably 5.0% by mass or more and 15.0% by mass or less of the total amount of the ink composition. When the content of the acylphosphine oxide polymerization initiator falls within the above range, abrasion resistance may be further enhanced.

The above polymerization initiators may be used alone or in combination of two or more. Using an acylphosphine oxide polymerization initiator in combination with a thioxanthone polymerization initiator may enhance the curability of the composition and prevent the cured film from becoming stained in the early stage subsequent to the ink jet recording. Thus, the polymerization initiator preferably includes an acylphosphine oxide polymerization initiator and more preferably includes an acylphosphine oxide polymerization initiator and a thioxanthone polymerization initiator.

Among thioxanthone polymerization initiators, 2,4-diethylthioxanthone is preferable because it markedly enhances the sensitivity of the ink composition to an acylphosphine oxide polymerization initiator and is excellent in terms of solubility in polymerizable compounds and safety.

Examples of commercial thioxanthone polymerization initiators include "KAYACURE DETX-S" (product name) produced by Nippon Kayaku Co., Ltd.; "ITX" produced by BASF SE; and "Quantacure CTX" produced by Aceto Chemical.

The content of the thioxanthone polymerization initiator in the ink composition is preferably 1.0% by mass or more and 10.0% by mass or less, is more preferably 1.5% by mass or more and 5.0% by mass or less, and is further preferably 2.0% by mass or more and 3.0% by mass or less of the total amount of the ink composition.

Polymerization Inhibitor

The ink composition according to the embodiment may include a polymerization inhibitor. Examples of the polymerization inhibitor include, but are not limited to, phenols, quinones, amines, nitro compounds, oximes, and sulfur compounds. Examples of the phenols include, but are not limited to, p-methoxyphenol, cresol, tert-butylcatechol, di-tert-butyl-para-cresol, hydroquinone monomethyl ether, α-naphthol, 3,5-di-tert-butyl-4-hydroxytoluene, 2,2'-methylenebis(4-methyl-6-tert-butylphenol), 2,2'-methylenebis(4-ethyl-6-butylphenol), and 4,4'-thiobis(3-methyl-6-tert-butylphenol). Examples of the quinones include, but are not limited to, p-benzoquinone, anthraquinone, naphthoquinone, phenanthraquinone, p-xyloquinone, p-toluquinone, 2,6-dichloroquinone, 2,5-diphenyl-p-benzoquinone, 2,5-diacetoxy-p-benzoquinone, 2,5-dicaproxy-p-benzoquinone, 2,5-diacyloxy-p-benzoquinone, hydroquinone, 2,5-di-butylhydroquinone, mono-t-butylhydroquinone, monomethylhydroquinone, and 2,5-di-t-amylhydroquinone. Examples of the amines include, but are not limited to, phenyl-β-naphthylamine, p-benzylaminophenol, di-β-naphthyl-para-phenylenediamine, dibenzylhydroxylamine, phenylhydroxylamine, diethylhydroxylamine, a compound including a 2,2,6,6-tetramethylpiperidine-N-oxyl skeleton, a compound including a 2,2,6,6-tetramethylpiperidine skeleton, a compound including a 2,2,6,6-tetramethylpiperidine-N-alkyl skeleton, and a compound including a 2,2,6,6-tetramethylpiperidine-N-acyl skeleton. Examples of the nitro compounds include, but are not limited to, dinitrobenzene, trinitrotoluene, and picric acid. Examples of the oximes include, but are not limited to, quinone dioxime and cyclohexanone oxime. Examples of the sulfur compounds include, but are not limited to, phenothiazine. The above polymerization inhibitors may used alone or in combination of two or more. Among the above polymerization inhibitors, a phenol and an amine are preferably used in combination with each other, and p-methoxyphenol and a compound including a 2,2,6,6-tetramethylpiperidine-N-oxyl skeleton are more preferably used in combination with each other in order to suppress the polymerization of monomers under hypoxic or aerobic conditions.

The content of the polymerization inhibitor in the ink composition according to the embodiment is preferably 0.01% by mass or more and 5.0% by mass or less, is more preferably 0.05% by mass or more and 3.0% by mass or less, and is further preferably 0.1% by mass or more and 1.0% by mass or less of the total amount of the ink composition.

Surfactant

The ink composition according to the embodiment may include a surfactant in order to enhance abrasion resistance. Examples of the surfactant include, but are not limited to, a silicone surfactant. Examples of the silicone surfactant include, but are not limited to, polyether-modified silicones, such as polyether-modified polydimethylsiloxane; and polyester-modified silicones, such as polyester-modified polydimethylsiloxane. Examples of commercial silicone surfactants include "BYK-347", "BYK-348", "BYK—UV3500", "BYK—UV3510", "BYK—UV3530", and "BYK-UV3570" produced by BYK.

The content of the surfactant in the ink composition according to the embodiment is preferably 0.1% by mass or more and 5.0% by mass or less, is more preferably 0.2% by mass or more and 3.0% by mass or less, and is further preferably 0.3% by mass or more and 1.0% by mass or less of the total amount of the ink composition.

Colorant

The ink composition according to the embodiment may optionally include a colorant. The colorant may be a pigment or a dye. The pigment may be an inorganic pigment or an organic pigment. Specific examples of the pigment used in the embodiment include, but are not limited to, the following pigments.

Examples of carbon black included in a black ink include, but are not limited to, "No. 2300", "No. 900", "MCF88", "No. 33", "No. 40", "No. 45", "No. 52", "MA7", "MA8", "MA100", and "No. 2200B" produced by Mitsubishi Chemical Corporation; "5750", "5250", "5000", "3500", "1255", and "700" of "Raven" series produced by Columbia Carbon; "400R", "330R", and "660R" of "Regal" series produced by Cabot Corporation; "Mogul L" produced by Cabot Corporation; "700", "800", "880", "900", "1000", "1100", "1300", and "1400" of "Monarch" series produced by Cabot Corporation; "FW1", "FW2", "FW2V", "FW18", "FW200", "S150", "S160", and "S170" of "Color Black" series produced by Degussa AG; "35", "U", "V", and "140U" of "Printex" series produced by Degussa AG; and "6", "5", "4A", and "4" of "Special Black" series produced by Degussa AG.

Examples of a pigment included in a white ink include, but are not limited to, C.I. Pigment White 6, 18, and 21, titanium oxide, zinc oxide, zinc sulfide, antimony oxide, zirconium oxide, hollow white resin particles, and white polymer particles.

Examples of a pigment included in a yellow ink include, but are not limited to, C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Examples of a pigment included in a magenta ink include, but are not limited to, C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48:2, 48:5, 57:1, 88, 112, 114, 122, 123, 144, 146, 149, 150, 166, 168, 170, 171, 175, 176, 177, 178, 179, 184, 185, 187, 202, 209, 219, 224, and 245; and C.I. Pigment Violet 19, 23, 32, 33, 36, 38, 43, and 50.

Examples of a pigment included in a cyan ink include, but are not limited to, C.I. Pigment Blue 1, 2, 3, 15, 15:1, 15:2, 15:3, 15:34, 15:4, 16, 18, 22, 25, 60, 65, and 66; and C.I. Vat Blue 4 and 60.

Examples of pigments other than the above pigments include, but are not limited to, C.I. Pigment Green 7 and 10; C.I. Pigment Brown 3, 5, 25, and 26; and C.I. Pigment Orange 1, 2, 5, 7, 13, 14, 15, 16, 24, 34, 36, 38, 40, 43, and 63.

The average particle size of the pigment is preferably 50 nm or more and 300 nm or less, is more preferably 55 nm or more and 200 nm or less, is further preferably 60 nm or more and 150 nm or less, and is most preferably 65 nm or more and 100 nm or less. In the present disclosure, average particle size is on a volume basis unless otherwise specified. Average particle size may be measured using, for example, a particle size distribution analyzer based on a laser diffraction scattering method. Examples of the particle size distribution analyzer include a particle size distribution analyzer "Microtrac UPA" produced by Nikkiso Co., Ltd., which is based on a dynamic light scattering method.

The content of the colorant in the ink composition according to the embodiment is preferably 1.0% by mass or more and 25.0% by mass or less, is more preferably 1.5% by mass or more and 20.0% by mass or less, and is further preferably 2.0% by mass or more and 15.0% by mass or less of the total amount of the ink composition.

Dispersant

In the case where the ink composition includes a pigment, the ink composition may further include a dispersant in order to enhance the dispersibility of the pigment in the ink composition. Examples of the dispersant include, but are not limited to, a polymer dispersant. Examples of the polymer dispersant include, but are not limited to, polyoxyalkylene-polyalkylenepolyamine, a vinyl polymer, an acrylate polymer, a polyester, a polyamide, a polyimide, a polyurethane, an amino polymer, a silicon-containing polymer, a sulfur-containing polymer, a fluorine-containing polymer, and an epoxy resin. Examples of commercial polymer dispersants include "AJISPER" series produced by Ajinomoto Fine-Techno Co., Inc.; "36000" of "Solsperse" series produced by Lubrizol Corporation; "DISPERBYK" series produced by BYK Additives&Instruments; and "DISPARLON" series produced by Kusumoto Chemicals, Ltd.

The content of the dispersant in the ink composition according to the embodiment is preferably 0.1% by mass or more and 5.0% by mass or less, is more preferably 0.1% by mass or more and 3.0% by mass or less, and is further preferably 0.2% by mass or more and 1.0% by mass or less of the total amount of the ink composition.

Other Additives

The ink composition according to the embodiment may include constituents other than the above-described constituents. Examples of such constituents include, but are not limited to, a polymerization accelerator, a penetration enhancer, a humectant, a fixing agent, an antifungal agent, an antiseptic agent, an antioxidant, an ultraviolet absorber, a chelating agent, a pH adjuster, and a thickener.

The ink composition according to the embodiment may be prepared by mixing the above-described constituents with one another in an appropriate order and subjecting the resulting mixture to filtration or the like as needed to remove impurities, foreign matter, and the like. For mixing the constituents with one another, for example, the materials are charged into a container equipped with a stirring device, such as a mechanical stirrer or a magnetic stirrer, and the resulting mixture is stirred. For performing the filtration, for example, centrifugal filtration and membrane filtration may be used.

The viscosity of the ink composition at 20° C. is preferably less than 30 mPa·s and is more preferably 5 mPa·s or more and less than 20 mPa·s. When the viscosity of the ink composition falls within the above range, the solubilities of the photopolymerization initiator and the other additives may be enhanced. Moreover, high ejection consistency is likely to be achieved during ink jet recording. The viscosity of the ink composition is measured at 25° C. using an E-type viscometer, such as "TVE-22" produced by Toki Sangyo Co., Ltd.

Ink Jet Recording Method

The ink composition according to the embodiment is used in an ink jet recording method. An ink jet recording method according to the embodiment includes an ink deposition step of ejecting the above-described ink composition according to the embodiment from a recording head and depositing the ink composition to a recording medium.

The above ink jet recording method is a recording method in which the ink composition is charged into an ink jet apparatus and used for recording. Examples of the ink jet apparatus include, but are not limited to, a drop-on-demand ink jet apparatus. Examples of the drop-on-demand ink jet apparatus include an apparatus that uses an ink jet printing method in which a piezoelectric element disposed on the head is used; and an apparatus that used an ink jet recording method in which heat energy generated with, for example, a heater that is a heat resistance element disposed on the head is used. The ink jet apparatus may use any ink jet recording method. Each of the steps included in the ink jet recording method is described in detail below.

Ink Deposition Step

In the ink deposition step according to the embodiment, for example, the ink composition is ejected onto the surface (i.e., the image formation region) of a recording medium by an ink jet method so as to deposit on the recording medium and form an image. The ejection conditions may be determined appropriately in accordance with the physical properties of the ink composition that is to be ejected.

Recording Medium

Examples of the recording medium include, but are not limited to, absorbable and nonabsorbable recording media. Examples of the absorbable recording medium include, but are not limited to, plain paper, such as electrophotographic paper; ink jet paper; and art paper, coated paper, and cast coated paper which are used in common offset printing. The ink jet paper may be, specifically, paper designed exclusively for use in ink jet printing which includes an ink absorption layer composed of silica or alumina powder particles or an ink absorption layer composed of a hydrophilic polymer, such as polyvinyl alcohol or polyvinylpyrrolidone.

Examples of the nonabsorbable recording medium include, but are not limited to, films and plates composed of plastics, such as polyvinyl chloride (hereinafter, referred to as "PVC"), polyethylene, polypropylene, and polyethylene terephthalate; plates made of metals, such as iron, silver, copper, and aluminum; and metal plates, plastic films, and plates made of alloys, such as stainless steel and brass, on which any of the above metals is deposited by vapor deposition. Among the above recording media, the nonabsorbable recording medium is preferable, the plastic films are more preferable, and the PVC film is further preferable.

Curing Step

The ink jet recording method according to the embodiment preferably includes a curing step of performing curing by irradiation with radiation in or subsequent to the ink deposition step. In this step, the image formed on the recording medium is irradiated with radiation to form a cured film.

Examples of a source of radiation used in the curing step include, but are not limited to, for example, a ultraviolet light-emitting diode (hereinafter, referred to as "UV-LED"), a ultraviolet laser diode (hereinafter, referred to as "UV-LD"), a mercury lamp, a metal halide lamp, a gas laser, and a solid-state laser. Among these, an UV-LED and an UV-LD are preferable and an UV-LED is more preferable because they are compact, have a long service life and a high efficiency, and are low in cost.

The irradiation with radiation may include a first irradiation step of performing irradiation with light having an emission peak wavelength of 380 nm or more and 400 nm or less and a second irradiation step of performing irradiation with light having a longer peak wavelength than the light used in the first irradiation step by 5 nm or more and 10 nm or less. In the case where dots are formed in the ink deposition step, the dots are semi-cured in the first irradiation in order to temporary fix the dots in place and prevent image quality from becoming degraded as a result of mixing of the dots and then fully cured in the second irradiation. The emission peak wavelength of the source of radiation used in the first irradiation is preferably 365 nm or more and 405 nm or less and is more preferably 370 nm or more and 390 nm or less. The intensity of the first irradiation is preferably 50 mW/cm$^2$ or more and 500 mW/cm$^2$ or less. The emission peak wavelength of the source of radiation used in the second irradiation is preferably 365 nm or more and 405 nm or less and is more preferably 380 nm or more and 400 nm or less. The energy of irradiation is preferably 50 mJ/cm$^2$ or more and 1000 mJ/cm$^2$ or less and is more preferably 300 mJ/cm$^2$ or more and 800 mJ/cm$^2$ or less. The intensity of the second irradiation is preferably 800 mW/cm$^2$ or more and 2000 mW/cm$^2$ or less. The ink composition according to the embodiment is an ink composition that has excellent curability even when it is used in the curing step conducted at the above irradiation intensity.

The ink jet recording method according to the embodiment may optionally include any of the public known steps included in the ink jet recording methods used in the related art.

Recorded Article

A recorded article according to the embodiment is an article in which an image is recorded by the above-described ink jet recording method. The image recorded in the recording medium is formed using the above-described radiation-curing ink composition and therefore has excellent flexibility.

The use of the recorded article according to the embodiment is not limited and may be used as an image recorded in a recording medium as described above. Since the image recorded in a recording medium has excellent flexibility, it is particularly suitably used as a sticker for items required to have high bendability and stretchability.

According to the embodiment, an ink composition having excellent adhesion, excellent abrasion resistance, excellent storage stability, and a low viscosity may be provided.

EXAMPLES

The present disclosure is described more specifically with reference to Examples and Comparative examples below. The present disclosure is not limited by Examples below.

Examples 1 to 23 and Comparative Examples 1 to 3

Preparation of Ink Compositions

Ink compositions were prepared by mixing materials with one another at the proportions described in Table 1 below and stirring the resulting mixture to a sufficient degree. Specifically, each of the ink compositions was prepared by mixing the materials with one another to form a uniform mixture and removing insolubles from the mixture through a membrane filter having a pore size of 5 μm. The ink compositions were evaluated by the evaluation methods described below.

Ink Jet Recording Method

A specific one of the ink compositions was charged into the nozzle columns of an ink jet printer "PX-G5000" (product name) produced by Seiko Epson Corporation. At normal temperature and normal pressure, while a solid pattern image was formed on a PVC film "IJ180-10" (product name) produced by 3M Japan Limited. with an ink dot diameter being set to middle size such that the resulting printed article had a thickness of 10 μm, the first irradiation was performed using light having a wavelength of 385 nm which was emitted from an UV-LED included in an ultraviolet irradiation device disposed in the vicinity of a carriage such that the irradiation intensity was 100 mW/cm$^2$ and the second irradiation was subsequently performed using light having a wavelength of 395 nm such that the irradiation intensity was 1000 mW/cm$^2$ and the cumulative amount of light was 700 mJ/cm$^2$ in order to cause the solid pattern image to cure. In the above-described manner, a recorded article that included a PVC film and a solid pattern image formed in the film was prepared. The recorded article was evaluated by the evaluation methods described below.

Evaluation Methods

Adhesion

The edge of a cutter was held to the image formed in the recorded article so as to be perpendicular to the image, and 6 cuts (intervals between the cuts: 1 mm, the same applies hereinafter) were formed in the image. After the formation of the 6 cuts, the recorded article was rotated 90°, and another 6 cuts were formed in the image so as to intersect the existing cuts at right angles. Hereby, grid-like cuts were formed in the image. A transparent adhesive tape (width: 25±1 mm) having a length of about 75 mm was attached to the grid-like cuts formed in the image. The tape was rubbed with a finger to a sufficient degree such that the image could be seen through the tape. Within 5 minutes after the tape had been attached to the image, the tape was certainly removed from the image within 0.5 to 1.0 seconds by being drawn at an angle of approximately 60°. Subsequently, the conditions of the image were visually inspected. The evaluation criteria used were as follows.

A: Detachment of the cured film did not occur, or the proportion of grid cells in which detachment of the cured film occurred was 5% or less.

B: The proportion of grid cells in which detachment of the cured film occurred was more than 5% and 35% or less.

C: The proportion of grid cells in which detachment of the cured film occurred was more than 35%.

Storage Stability

A specific one of the ink compositions was charged into an ink container. After the ink composition had been subjected to an accelerated test at 60° C. for 7 days, the viscosity of the ink composition at 20° C. was measured. An increase in viscosity ([Viscosity of ink composition at 20° C. after accelerated test]/[Viscosity of ink composition at 20° C. before accelerated test]×100) was determined. The viscosity of the ink composition was measured by the method described in the section "Viscosity" below. The evaluation criteria used were as follows.

A: Less than 3%

B: 3% to 5%

C: More than 5%

Abrasion Resistance

The abrasion resistance of the recorded article was evaluated using "Color Fastness Rubbing Tester" produced by TESTER SANGYO CO., LTD. in accordance with JIS K5701:2000 (ISO 11628:1995). A piece of calico was placed on the surface of the image formed in the recorded article. The image was rubbed at a load of 400 g. After the image had been rubbed, the detachment of the image from the recorded article and scratches formed in the image were visually inspected. The evaluation criteria used were as follows.

A: No stain was observed in the piece of calico. The detachment of the image and scratches formed in the image were not observed.

B: Stains were observed in the piece of calico. The detachment of the image and scratches formed in the image were not observed.

C: Stains were observed in the piece of calico. The detachment of the image and scratches formed in the image were observed.

Viscosity

The viscosity of each of the ink compositions at 25° C. was measured with a DVM-E-type rotational viscometer produced by TOKYO KEIKI INC. The rotor used was a cone designed exclusively for DVM-E-type, which had a cone angle of 1° 34' and a cone radius of 2.4 cm. The rotation speed was set to 10 rpm. The evaluation criteria used were as follows.

A: Less than 20 mPa·s

B: 20 mPa·s or more and less than 25 mPa·s

C: 25 mPa·s or more

Stretchability

The recorded article was cut into a piece having a predetermined size (hereinafter, the length of the piece is represented by $L_0$). The piece of the recorded article was placed in a tensile testing machine produced by A&D Company, Limited. After the test speed of the tensile testing machine had been set to 100 mm/min, the recorded article was pulled with the tensile testing machine. The time at which cracking or detaching (hereinafter, referred to collectively as "cracking or the like") occurred in the recorded article was visually determined. The length of the stretched recorded article was calculated based on the amount of time from when the tensile test was started to when cracking or the like occurred (hereinafter, the length of the stretched recorded article is represented by $L_1$). The elongation (%) at which cracking or the like occurred in the image formed in the PVC film was calculated using Formula (2) below in order to evaluate the stretchability of the recorded article.

$$\text{Elongation at which cracking or the like occurred in the image}(\%)=\{(L_1-L_0)/L_0\}\times 100 \quad (2)$$

The evaluation criteria used were as follows.

A: Elongation was 300% or more.

B: Elongation was 200% or more and less than 300%.

C: Elongation was 100% or more and less than 200%.

D: Elongation was less than 100%.

Solubility of Polymerization Initiator

Only the acrylates (A) to (C), the monomer (D), the difunctional or higher monomer, and the polymerization initiator were added to a beaker at the compositional ratios described in a specific one of Examples and Comparative examples described in Table 1 to form a liquid mixture. The liquid mixture was stirred with a stirrer "High-power stirrer HPS-100" (product name) produced by AS ONE Corporation with a rotational speed of 300 rpm at room temperature (25° C.). The solubility of the polymerization initiator was evaluated in accordance with the following evaluation criteria.

A: The polymerization initiator was dissolved and the solid content was not visually confirmed after stirring had been performed for less than 15 minutes.

B: The polymerization initiator was dissolved and the solid content was not visually confirmed after stirring had been performed for 15 minutes or more and less than 60 minutes.

C: The polymerization initiator was not dissolved and the solid content was visually confirmed even after stirring had been performed for 60 minutes.

TABLE 1

| | | | Example 1 | Example 2 | Example 3 | Example 4 | Example 5 | Example 6 | Example 7 |
|---|---|---|---|---|---|---|---|---|---|
| Ink composition (mass %) | Acrylate (A) | BCEA | 15.0 | 30.0 | 5.0 | 15.0 | 15.0 | 15.0 | 15.0 |
| | Acrylate (B) | PHEA | 25.0 | 25.0 | 25.0 | 50.0 | 5.0 | | 15.0 |
| | | BZA | | | | | | 25.0 | 10.0 |
| | Acrylate (C) | TMCHA (Tg = 30° C.) | 25.0 | 10.0 | 35.0 | 10.0 | 45.0 | 25.0 | 25.0 |
| | | TBCHA (Tg = 38° C.) | | | | | | | |
| | | IBOA (Tg = 94° C.) | | | | | | | |
| | | DCPDA (Tg = 110° C.) | | | | | | | |
| | | DCPA (Tg = 120° C.) | | | | | | | |

TABLE 1-continued

|  |  |  | | | | | | | |
|---|---|---|---|---|---|---|---|---|---|
|  | Monomer (D) | nVC | 17.6 | 17.6 | 17.6 | 7.6 | 17.6 | 17.6 | 17.6 |
|  |  | ACMO |  |  |  |  |  |  |  |
|  | Multifunctional | VEEA | 3.0 | 3.0 | 3.0 | 3.0 | 3.0 | 3.0 | 3.0 |
|  | monomer | DPGDA |  |  |  |  |  |  |  |
|  | Polymerization | 819 | 5.0 | 5.0 | 5.0 | 5.0 | 5.0 | 5.0 | 5.0 |
|  | initiator | TPO | 4.0 | 4.0 | 4.0 | 4.0 | 4.0 | 4.0 | 4.0 |
|  |  | DETX | 2.5 | 2.5 | 2.5 | 2.5 | 2.5 | 2.5 | 2.5 |
|  | Polymerization | LA-7RD | 0.1 | 0.1 | 0.1 | 0.1 | 0.1 | 0.1 | 0.1 |
|  | inhibitor | MEHQ | 0.1 | 0.1 | 0.1 | 0.1 | 0.1 | 0.1 | 0.1 |
|  | Surfactant | BYK-UV3500 | 0.5 | 0.5 | 0.5 | 0.5 | 0.5 | 0.5 | 0.5 |
|  | Pigment | C.I. PB 15:3 | 2.0 | 2.0 | 2.0 | 2.0 | 2.0 | 2.0 | 2.0 |
|  | Dispersant | Solsperse36000 | 0.2 | 0.2 | 0.2 | 0.2 | 0.2 | 0.2 | 0.2 |
| Evaluations | Adhesion |  | A | A | B | A | A | A | A |
|  | Abrasion resistance |  | A | A | A | B | A | A | A |
|  | Storage stability |  | A | B | A | A | A | A | A |
|  | Viscosity |  | A | B | A | A | A | A | A |
|  | Stretchability |  | A | A | A | A | A | A | A |
|  | Solubility of polymerization initiator |  | A | A | A | A | B | A | A |

|  |  |  | Example 8 | Example 9 | Example 10 | Example 11 | Example 12 | Example 13 | Example 14 |
|---|---|---|---|---|---|---|---|---|---|
| Ink composition (mass %) | Acrylate (A) | BCEA | 15.0 | 15.0 | 15.0 | 15.0 | 15.0 | 15.0 | 15.0 |
|  | Acrylate (B) | PHEA | 25.0 | 25.0 | 25.0 | 25.0 | 25.0 | 25.0 | 25.0 |
|  |  | BZA |  |  |  |  |  |  |  |
|  | Acrylate (C) | TMCHA (Tg = 30° C.) | 25.0 | 25.0 | 23.0 | 28.0 |  |  |  |
|  |  | TBCHA (Tg = 38° C.) |  |  |  |  | 25.0 |  |  |
|  |  | IBOA (Tg = 94° C.) |  |  |  |  |  | 25.0 |  |
|  |  | DCPDA (Tg = 110° C.) |  |  |  |  |  |  | 25.0 |
|  |  | DCPA (Tg = 120° C.) |  |  |  |  |  |  |  |
|  | Monomer (D) | nVC | 17.6 | 17.6 | 17.6 | 17.6 | 17.6 | 17.6 | 17.6 |
|  |  | ACMO |  |  |  |  |  |  |  |
|  | Multifunctional | VEEA |  | 1.5 | 5.0 |  | 3.0 | 3.0 | 3.0 |
|  | monomer | DPGDA | 3.0 | 1.5 |  |  |  |  |  |
|  | Polymerization | 819 | 5.0 | 5.0 | 5.0 | 5.0 | 5.0 | 5.0 | 5.0 |
|  | initiator | TPO | 4.0 | 4.0 | 4.0 | 4.0 | 4.0 | 4.0 | 4.0 |
|  |  | DETX | 2.5 | 2.5 | 2.5 | 2.5 | 2.5 | 2.5 | 2.5 |
|  | Polymerization | LA-7RD | 0.1 | 0.1 | 0.1 | 0.1 | 0.1 | 0.1 | 0.1 |
|  | inhibitor | MEHQ | 0.1 | 0.1 | 0.1 | 0.1 | 0.1 | 0.1 | 0.1 |
|  | Surfactant | BYK-UV3500 | 0.5 | 0.5 | 0.5 | 0.5 | 0.5 | 0.5 | 0.5 |
|  | Pigment | C.I. PB 15:3 | 2.0 | 2.0 | 2.0 | 2.0 | 2.0 | 2.0 | 2.0 |
|  | Dispersant | Solsperse36000 | 0.2 | 0.2 | 0.2 | 0.2 | 0.2 | 0.2 | 0.2 |
| Evaluations | Adhesion |  | A | A | A | A | A | A | A |
|  | Abrasion resistance |  | A | A | A | A | A | A | A |
|  | Storage stability |  | A | A | A | A | A | A | A |
|  | Viscosity |  | A | A | A | A | A | A | A |
|  | Stretchability |  | A | A | B | A | A | A | A |
|  | Solubility of polymerization initiator |  | A | A | A | A | A | A | A |

|  |  |  | Example 15 | Example 16 | Example 17 | Example 18 | Example 19 | Example 20 | Example 21 |
|---|---|---|---|---|---|---|---|---|---|
| Ink composition (mass %) | Acrylate (A) | BCEA | 15.0 | 25.0 | 25.0 | 10.0 | 25.0 | 25.0 | 11.6 |
|  | Acrylate (B) | PHEA | 25.0 | 35.0 | 40.0 | 10.0 | 28.6 | 32.6 | 15.0 |
|  |  | BZA |  |  |  |  |  |  |  |
|  | Acrylate (C) | TMCHA (Tg = 30° C.) |  | 4.0 |  | 51.0 | 25.0 | 25.0 | 25.0 |
|  |  | TBCHA (Tg = 38° C.) |  |  |  |  |  |  |  |
|  |  | IBOA (Tg = 94° C.) |  |  |  |  |  |  |  |
|  |  | DCPDA (Tg = 110° C.) |  |  |  |  |  |  |  |
|  |  | DCPA (Tg = 120° C.) | 25.0 |  |  |  |  |  |  |
|  | Monomer (D) | nVC | 17.6 | 18.6 | 17.6 | 11.6 | 4.0 |  | 31.0 |
|  |  | ACMO |  |  |  |  |  |  |  |
|  | Multifunctional | VEEA | 3.0 | 3.0 | 3.0 | 3.0 | 3.0 | 3.0 | 3.0 |
|  | monomer | DPGDA |  |  |  |  |  |  |  |
|  | Polymerization | 819 | 5.0 | 5.0 | 5.0 | 5.0 | 5.0 | 5.0 | 5.0 |
|  | initiator | TPO | 4.0 | 4.0 | 4.0 | 4.0 | 4.0 | 4.0 | 4.0 |
|  |  | DETX | 2.5 | 2.5 | 2.5 | 2.5 | 2.5 | 2.5 | 2.5 |
|  | Polymerization | LA-7RD | 0.1 | 0.1 | 0.1 | 0.1 | 0.1 | 0.1 | 0.1 |
|  | inhibitor | MEHQ | 0.1 | 0.1 | 0.1 | 0.1 | 0.1 | 0.1 | 0.1 |
|  | Surfactant | BYK-UV3500 | 0.5 | 0.5 | 0.5 | 0.5 | 0.5 | 0.5 | 0.5 |
|  | Pigment | C.I. PB 15:3 | 2.0 | 2.0 | 2.0 | 2.0 | 2.0 | 2.0 | 2.0 |
|  | Dispersant | Solsperse36000 | 0.2 | 0.2 | 0.2 | 0.2 | 0.2 | 0.2 | 0.2 |
| Evaluations | Adhesion |  | A | A | A | A | B | B | A |
|  | Abrasion resistance |  | A | B | B | A | A | A | A |
|  | Storage stability |  | A | A | A | A | A | A | B |

TABLE 1-continued

|  |  |  | | | | | | | |
|---|---|---|---|---|---|---|---|---|---|
| | Viscosity | | A | A | A | A | A | A | A |
| | Stretchability | | A | A | A | A | A | A | A |
| | Solubility of polymerization initiator | | A | A | A | B | A | A | A |

|  |  |  | Example 22 | Example 23 | Comparative example 1 | Comparative example 2 | Comparative example 3 |
|---|---|---|---|---|---|---|---|
| Ink composition (mass %) | Acrylate (A) | BCEA | 15.0 | 30.0 | 31.0 | 4.0 | 15.0 |
| | Acrylate (B) | PHEA | 25.0 | 4.0 | 14.0 | 25.0 | 51.0 |
| | | BZA | | | | | |
| | Acrylate (C) | TMCHA (Tg = 30° C.) | 22.0 | 25.0 | 20.0 | 36.0 | 5.0 |
| | | TBCHA (Tg = 38° C.) | | | | | |
| | | IBOA (Tg = 94° C.) | | | | | |
| | | DCPDA (Tg = 110° C.) | | | | | |
| | | DCPA (Tg = 120° C.) | | | | | |
| | Monomer (D) | nVC | 17.6 | 23.6 | 17.6 | 17.6 | 11.6 |
| | | ACMO | | | | | |
| | Multifunctional monomer | VEEA | 6.0 | 3.0 | 3.0 | 3.0 | 3.0 |
| | | DPGDA | | | | | |
| | Polymerization initiator | 819 | 5.0 | 5.0 | 5.0 | 5.0 | 5.0 |
| | | TPO | 4.0 | 4.0 | 4.0 | 4.0 | 4.0 |
| | | DETX | 2.5 | 2.5 | 2.5 | 2.5 | 2.5 |
| | Polymerization inhibitor | LA-7RD | 0.1 | 0.1 | 0.1 | 0.1 | 0.1 |
| | | MEHQ | 0.1 | 0.1 | 0.1 | 0.1 | 0.1 |
| | Surfactant | BYK-UV3500 | 0.5 | 0.5 | 0.5 | 0.5 | 0.5 |
| | Pigment | C.I. PB 15:3 | 2.0 | 2.0 | 2.0 | 2.0 | 2.0 |
| | Dispersant | Solsperse36000 | 0.2 | 0.2 | 0.2 | 0.2 | 0.2 |
| Evaluations | Adhesion | | A | A | A | C | A |
| | Abrasion resistance | | A | A | A | A | C |
| | Storage stability | | A | B | C | A | A |
| | Viscosity | | A | B | C | A | A |
| | Stretchability | | D | A | A | A | A |
| | Solubility of polymerization initiator | | A | C | A | A | A |

The meanings of the abbreviations used in Table 1 are as follows.
Acrylate (A)
BCEA: 2-(Butylcarbamoyloxy)ethyl acrylate
Acrylate (B)
PHEA: 2-Phenoxyethyl acrylate
BZA: Benzyl acrylate
Acrylate (C)
TMCHA: 3,3,5-Trimethylcyclohexane acrylate
TBCHA: tert-Butylcyclohexyl acrylate
IBOA: Isobornyl acrylate
DCPDA: Dicyclopentadienyl acrylate
DCPA: Dicyclopentanyl acrylate
Monomer (D)
nVC: N-vinylcaprolactam
ACMO: 4-Acryloylmorpholine
Difunctional or Higher Monomers
VEEA: 2-(2-Vinyloxyethoxy)ethyl acrylate
DPGDA: Dipropylene glycol diacrylate
Polymerization Initiator
819: Bis(2,4,6-trimethylbenzoyl)phenylphosphine oxide "Irgacure 819" (product name) produced by BASF SE
TPO: 2,4,6-Trimethylbenzoyldiphenylphosphine oxide "Irgacure TPO" (product name) produced by BASF SE
DETX: 2,4-Diethylthioxanthone
Others
LA-7RD: a compound that includes a 2,2,6,6-tetramethylpiperidine-1-oxyl skeleton "LA-7RD" (product name) produced by ADEKA
MEHQ: p-Methoxyphenol
BYK-UV3500: silicone surfactant "BYK-UV3500" (product name) produced by BYK
C.I. PB 15:3: C.I. Pigment Blue 15:3
Solsperse36000: Polymer dispersant "Solsperse36000" (product name) produced by Lubrizol Corporation A comparison between the results obtained in Examples and the results obtained in Comparative examples reveals that the ink composition according to the embodiment may have excellent adhesion, excellent abrasion resistance, excellent storage stability, and a low viscosity. The results obtained in Examples 1, 10, and 22 confirm that markedly excellent stretchability may be achieved when the content of the monomer including two or more polymerizable functional groups in the ink composition is 5.0% by mass or less of the total amount of the ink composition. The results obtained in Examples 1 to 3 confirm that the ink composition may be evaluated as excellent in terms of all of the evaluation items, that is, adhesion, abrasion resistance, storage stability, viscosity, stretchability, and the solubility of a polymerization initiator, when the content of the acrylate (A) is 5.0% by mass or more and 30.0% by mass or less. A comparison between the results obtained in Examples 1 to 3 and the results obtained in Comparative example 1 reveals that the ink composition may be evaluated as excellent in terms of storage stability and viscosity when the content of the acrylate (A) is 30.0% by mass or less. A comparison between the results obtained in Examples 1 to 3 and the results obtained in Comparative example 2 reveals that the ink composition may be evaluated as excellent in terms of adhesion when the content of the acrylate (A) is 5.0% by mass or more. The results obtained in Examples 4, 5, and 23 confirm that the ink composition may be evaluated as excellent in terms of all of the evaluation items, that is, adhesion, abrasion resistance, storage stability, viscosity, stretchability, and the solubility of a polymerization initiator, when the content of the acrylate (B) is 4.0% by mass or more and 50.0% by mass or less. A comparison between the results obtained in Examples 4 and 5 and the results obtained in Example 23 reveals that the ink composition may be evaluated as excellent in terms of the solubility of a polymerization initiator when the content of the acrylate (B) is 5.0% by mass or more. A comparison between the results obtained in Examples 4 and 5 and the results obtained in Comparative example 3 reveals that the ink composition may be evaluated as excellent in terms of adhesion and abrasion resistance when the content of the acrylate (B) is 50.0% by mass or less. The results obtained in Examples 1, 6, and 7 confirm that the advantageous effects substantially do not vary with the type of the acrylate (B) used. The results obtained in Examples 1, 8, 9, 10, and 11 confirm that the ink composition may have excellent stretchability when the content of the multifunctional monomer is 5.0% by mass or less, regardless of the type of the multifunctional monomer used. The results obtained in Examples 1, 12, 13, 14, and 15 confirm that the ink composition may be evaluated as excellent in terms of all of the evaluation items, that is, adhesion, abrasion resistance, storage stability, viscosity, stretchability, and the solubility of a polymerization initiator, even when various types of the acrylate (C) are used. The results obtained in Examples 1, 16, and 18 confirm that the ink composition may be evaluated as excellent in terms of all of the evaluation items, that is, adhesion, abrasion resistance, storage stability, viscosity, stretchability, and the solubility of a polymerization initiator, when the content of the acrylate (C) is 5.0% by mass or more and 50.0% by mass or less. The results obtained in Examples 1 and 17 confirm that the ink composition may be evaluated as excellent in terms of all of the evaluation items, that is, adhesion, abrasion resistance, storage stability, viscosity, stretchability, and the solubility of a polymerization initiator, even when the ink composition does not include the acrylate (C). The results obtained in Examples 1, 19, and 21 confirm that the ink composition may be evaluated as excellent in terms of all of the evaluation items, that is, adhesion, abrasion resistance, storage stability, viscosity, stretchability, and the solubility of a polymerization initiator, when the content of the monomer (D) is 4.0% by mass or more and 31.0% by mass or less. The results obtained in Examples 1 and 20 confirm that the ink composition may be evaluated as excellent in terms of all of the evaluation items, that is, adhesion, abrasion resistance, storage stability, viscosity, stretchability, and the solubility of a polymerization initiator, even when the ink composition does not include the monomer (D).

What is claimed is:

1. A radiation-curing ink jet ink composition comprising:
   a urethane (meth)acrylate including one (meth)acryloyl group, an amount of the urethane (meth)acrylate being 5.0% by mass or more and 15% by mass or less of a total amount of the ink composition;
   a (meth)acrylate including an aromatic ring and one (meth)acryloyl group, an amount of the (meth)acrylate being 4.0% by mass or more and 50.0% by mass or less of the total amount of the ink composition; and
   a multifunctional (meth)acrylate, an amount of the multifunctional (meth)acrylate being 0% by mass or more and 5.0% by mass or less of the total amount of the ink composition,
   wherein the urethane (meth)acrylate has a total number of carbon atoms of 2 to 15.

2. The ink composition according to claim 1, further comprising:
   a (meth)acrylate including an alicyclic group,
   wherein a homopolymer of the (meth)acrylate has a glass-transition temperature of 30° C. or more.

3. The ink composition according to claim 2, wherein:
   the (meth)acrylate including an alicyclic group includes isobornyl acrylate, tert-butylcyclohexyl acrylate, dicyclopentadienyl acrylate, dicyclopentanyl acrylate, or 3,3,5-trimethylcyclohexyl acrylate.

4. The ink composition according to claim 1, further comprising:
   a monofunctional monomer including a heterocyclic group including a nitrogen atom.

5. The ink composition according to claim 4, wherein:
   the monofunctional monomer including a heterocyclic group including a nitrogen atom includes N-vinylcaprolactam or (meth)acryloylmorpholine.

6. The ink composition according to claim 1, further comprising:
   an acylphosphine oxide polymerization initiator including an aromatic ring.

7. The ink composition according to claim 1, wherein the urethane (meth)acrylate is an alkylcarbamoyloxyalkyl (meth)acrylate.

* * * * *